Aug. 2, 1938.  V. L. RONCI  2,125,315
METHOD OF FORMING GLASS TO METAL SEALS
Filed Feb. 4, 1936
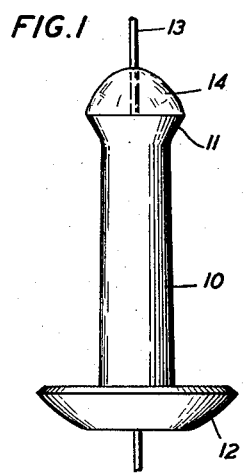
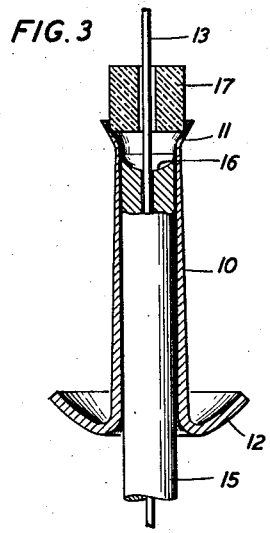
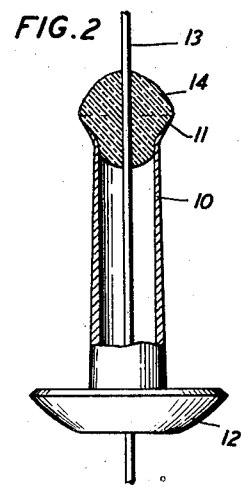
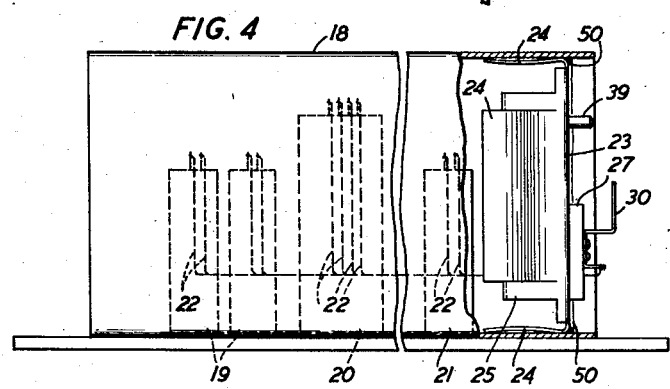
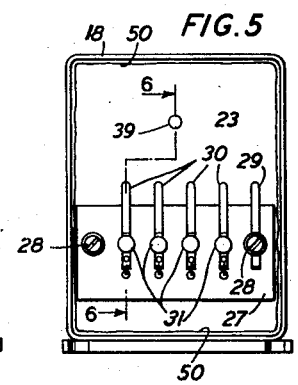
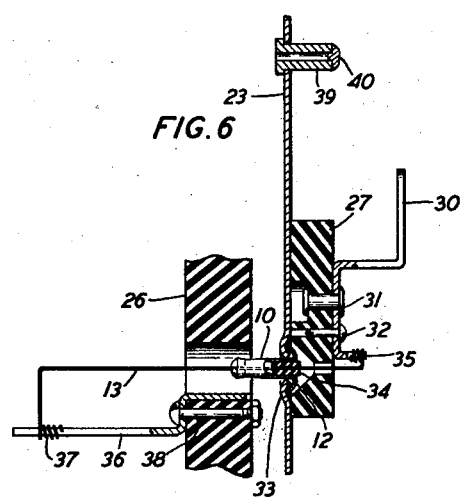
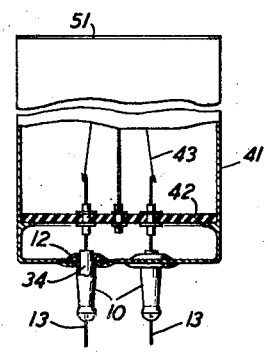
INVENTOR
V. L. RONCI
BY
Walter E. Kiesel
ATTORNEY Patented Aug. 2, 1938

2,125,315

UNITED STATES PATENT OFFICE 2,125,315

METHOD OF FORMING GLASS TO METAL SEALS

Victor L. Ronci, Brooklyn, N. Y., assignor to Bell Telephone Laboratories, Incorporated, New York, N. Y., a corporation of New York Application February 4, 1936, Serial No. 62,252

1 Claim. (Cl. 49—81)

This invention relates to methods of forming glass to metal seals and more particularly to the fabrication of one or more insulated conductors adapted to be associated with a metallic member serving as a partial or complete enclosure for electrical apparatus.

In electrical apparatus, particularly apparatus utilized in speech transmission systems employing ultra-high frequency currents, a very high electrical efficiency must be maintained in order to enable satisfactory transmission of a wide band of frequencies. Furthermore, the apparatus must have stability in operation so that the maintenance cost will be low. In order to attain these results, the apparatus may be enclosed in an air-tight metallic container so that atmospheric conditions are ineffective to alter the characteristics of the apparatus. The terminal conductors on the container should form airtight seals with the container and also provide sufficient insulation resistance to avoid current leakage and hence to prevent breakdown of the apparatus.

One object of this invention is to expedite and to reduce the cost of the production of efficient insulated terminal conductors for electrical apparatus.

In one illustrative embodiment of this invention, an insulated terminal conductor comprises a wire surrounded by a tubular metallic member or eyelet which supports the wire through the intermediary of a vitreous insulating spacer, such as a glass bead, fused to the wire and a flared end of the tubular member or eyelet.

In accordance with this invention, the insulated terminal conductor is fabricated by arranging the wire concentrically within the tubular member or eyelet with a short glass sleeve surrounding a portion of the wire and seated in the flared end of the tubular member. The glass sleeve is then heated so that it becomes plastic to form a bead which is simultaneously welded to the wire and the tubular member whereby an airtight seal is produced. In this method, it will be apparent that the three elements, namely the wire, insulating member, and tubular member are fabricated into a unitary assembly in a single operation so that an efficient and effective airtight seal is produced in a manner readily adaptable to economical mass production by machine.

The invention and the features thereof will be understood more clearly and fully from the following detailed description with reference to the accompanying drawing in which:

Fig. 1 is an elevational view of an insulated terminal conductor constructed in accordance with this invention;

Fig. 2 is another elevational view of the conductor shown in Fig. 1, partly in cross-section to illustrate the relation of the several elements thereof;

Fig. 3 is a view in cross-section showing the relation of the elements of the conductor illustrated in Figs. 1 and 2, prior to the heating of the vitreous element;

Fig. 4 is a side view, partly in cross-section, of an electrical filter casing utilizing terminal conductors constructed in accordance with this invention;

Fig. 5 is an end view of the apparatus shown in Fig. 4 illustrating the arrangement of the terminals therefor;

Fig. 6 is an enlarged detail view in cross-section along line 6—6 of Fig. 5; and Fig. 7 is a fragmentary view, partly in cross-section, of a portion of an electron discharge device showing another application in which the terminal conductors constructed in accordance with this invention may be employed.

Referring now to the drawing, the terminal conductor shown in Figs. 1 and 2 comprises a tubular metallic member or eyelet 10, for example of copper, having a flared portion 11 machined to a knife edge at one end and a dished flange 12 at the other end. A wire 13, for example of platinum or of the composition known as "Cunife", is disposed centrally within the tubular member 10 and has sealed thereto a glass bead 14 which is sealed also to the flared portion 11.

In the fabrication of the conductor, as shown in Fig. 3, the wire 13 is held centrally within the tubular member or eyelet 10 by a tubular metallic spacer 15, one end of which is recessed as indicated at 16. The wire 13 is encompassed by a relatively thick glass sleeve 17 seated upon the flared end portion 11 of the tubular member 10. With the various elements in the position shown in Fig. 3, the sleeve 17 is heated so that it becomes plastic, flows about the wire 13 and into the recess 16, and welds to the wire 13 and the flared end portion 11 to form airtight seals therewith. Th glass member, now in the form shown in Fig. 2, is allowed to cool and the spacer member 15 is then withdrawn.

The glass sleeve 17 may be heated to render it plastic by a suitable flame or by heating the tubular member 10 by high frequency induction as described in my copending application, Serial No. 62,253, filed February 4, 1936.

The terminal conductors constructed in accordance with this invention may be used to advantage in electrical apparatus such as a filter as shown in Figs. 4, 5 and 6. As illustrated in these figures, the filter apparatus comprises a metallic container 18 in which suitable condensers 19, an inductance 20 and a crystal 21, each provided with suitable leading in conductors 22, are mounted. The container 18 is closed at one end by an integral plate and at the other end by a cover 23 having flanges 24. The cover 23 is sealed to the container by a continuous fillet of solder extending around the edge of the cover. The cover 23 is provided with integral arms 25 carrying an inner insulating block 26, and has mounted thereon an outer insulating block 27. The insulating block 27 may be affixed to the cover 23 by a pair of screws 28, one of which, as shown in Fig. 5, also holds a ground terminal 29 in position. As illustrated in Fig. 6, the insulating block 27 supports a plurality of bracket-like terminal members 30, each of which is secured to the block by an eyelet 31 and is held against rotation by a stud 32 forced into an aperture in the block 27.

The cover 23 carries also a plurality of terminal conductors constructed in accordance with this invention, which are disposed in alignment with the terminal members 30. The dished flange 12 of each of the terminal conductors is seated in a troughed portion 33 in the cover 23 and affixed, as by soldering, to the cover. One end of the wire 13 of each terminal member, which may be encompassed by an insulating sleeve 34 fitted within the tubular member 10, is wound about and soldered to one end of the terminal member 30 as indicated at 35. The other end of the wire 13 extends through an aperture in the insulating block 26 and is wound about and soldered to another terminal member 36 as indicated at 37, the terminal member 36 being fastened to the block 26 as by a bolt 38.

The cover 23 may be provided with a suitable inlet 39 through which dry air may be passed into the container 18 for the purpose of ridding the apparatus of moisture. The inlet may be sealed by a drop of solder as shown at 40.

Another advantageous application of terminal conductors constructed in accordance with this invention is illustrated in Fig. 7 wherein there is shown a portion of the enclosing vessel 41 of an all-metal electron discharge device in which an insulating member 42 is mounted within the vessel, which may serve as the anode of the device, and a filament 43 is supported by the insulating member 42. The terminal conductors are secured to the base of the vessel 41, as by soldering the flange 12 thereto, and the wires 13 connected to the filament 43 to serve as leading in conductors therefor. The insulating member 42 and filament 43 may be inserted through the upper end of the vessel 41 and this end then closed by a cover or end plate 51 which may be welded to the container 41.

Although specific embodiments and applications of this invention have been shown and described, it will be understood, of course, that the invention is capable of a variety of other applications and that modifications may be made therein without departing from the scope and spirit thereof as defined in the appended claim.

What is claimed is:

The method of fabricating an insulated terminal conductor which comprises forming a tubular metallic eyelet with a flared end portion, inserting a wire through said eyelet, inserting a cylindrical spacer member having a recessed end into said eyelet for holding said wire coaxial with said eyelet, positioning said spacer member so that said recessed end is within said eyelet and in proximity to said flared end portion with the recess opening toward said flared end portion, sliding a glass sleeve about said wire and seating it in said flared end portion, heating said sleeve while said assembled eyelet, spacer member and wire are vertically disposed to render said sleeve sufficiently plastic to flow into intimate engagement with said wire, flared end portion and recessed end solely under the influence of gravitational forces, sealing the plastic glass simultaneously to said wire and said flared end portion, and withdrawing said spacer member.

VICTOR L. RONCI.